United States Patent
Fan et al.

(10) Patent No.: US 6,757,081 B1
(45) Date of Patent: Jun. 29, 2004

(54) METHODS AND APPARATUS FOR ANALYZING AND IMAGE AND FOR CONTROLLING A SCANNER

(75) Inventors: Jian Fan, Cupertino, CA (US); Charles Chi Jia, San Diego, CA (US); Anne-Marie Woodson, Lemon Grove, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/545,223

(22) Filed: Apr. 7, 2000

(51) Int. Cl.$^7$ ................................................ H04N 1/04
(52) U.S. Cl. ...................... 358/474; 358/448; 358/467; 358/2.1; 382/173
(58) Field of Search ........................ 358/474, 1.2, 1.11, 358/505, 448, 453, 455, 467, 462, 464, 2.1, 538; 382/296, 176, 173

(56) References Cited

U.S. PATENT DOCUMENTS

| | | | | | |
|---|---|---|---|---|---|
| 4,751,585 | A | * | 6/1988 | Shibazaki | 358/294 |
| 5,056,154 | A | * | 10/1991 | Aono et al. | 382/261.1 |
| 5,818,978 | A | * | 10/1998 | Al-Hussein | 382/296 |
| 5,956,468 | A | * | 9/1999 | Ancin | 358/1.9 |
| 6,009,196 | A | * | 12/1999 | Mahoney | 382/176 |

OTHER PUBLICATIONS

K. W. Yong, R. G. Casey and F. M. Wahl, Document Analysis Sustem; IBM J. Res. Develop., vol. 26, No. 6, pp 647–656, Nov. 1982.

J. Kittler and J. Illingworth, Minimum Error Thresholding; Pattern Recognition, vol. 19, No. 1, pp 41–47, 1986.

Rafael C. Gonzalez and Paul Wintz, Digital Image Processing; Addison–Wesley Publishing Company, pp 30–33, Second Edition, 1987.

Berthold Klaus Paul Horn, Robot Vision; The MIT Press, pp 69–71, 1986.

* cited by examiner

*Primary Examiner*—Kimberly Williams
*Assistant Examiner*—Negussie Worku

(57) ABSTRACT

A method analyzes an image to be scanned and analyzes at least part of the image pixel-by-pixel. During or after a preview scan, a characteristic is assigned to a plurality of pixels in the image and pixels are grouped according to similar characteristics. A representation of a least one of the characteristics corresponding to a group of pixels is communicated to the scanner. For example, the pixels may be analyzed to determining if the pixel is black or white. The pixels may also be analyzed to determining if a pixel is on an edge between black and white. Black pixels that are adjacent each other can be grouped together, and white pixels that are adjacent each other can also be grouped together. A region of an image with a relatively high number of black and white groups can be characterized as black and white text only. That characterization can then be used to properly set a scanner, for example, without user intervention, so that the final scan of the image can be done at 300 dpi with a low bit depth.

33 Claims, 14 Drawing Sheets

FIG. 9

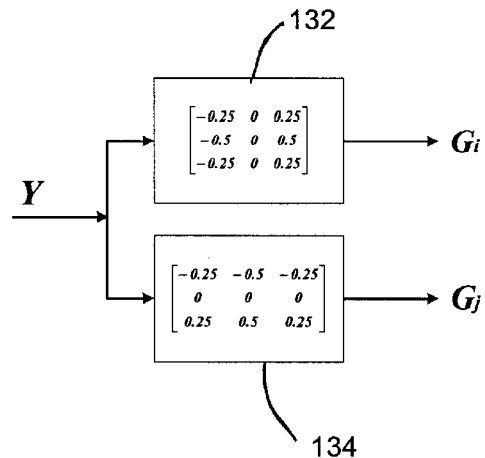

FIG. 10

$$C(Y, \|\nabla Y\|, Chroma) = \begin{cases} \text{WHITE}, & chroma < T_c \text{ AND } \|\nabla Y\| < T_e \text{ AND } Y \geq T_w \\ \text{WHITE EDGE}, & chroma < T_c \text{ AND } \|\nabla Y\| \geq T_e \text{ AND } Y \geq T_w \\ \text{GRAY}, & chroma < T_c \text{ AND } \|\nabla Y\| < T_e \text{ AND } T_g \leq Y < T_w \\ \text{GRAY EDGE}, & chroma < T_c \text{ AND } \|\nabla Y\| \geq T_e \text{ AND } T_g \leq Y < T_w \\ \text{BLACK}, & (chroma < T_c \text{ AND } Y < T_g) \text{ OR } Y \leq 30 \\ \text{COLOR}, & chroma \geq T_c \text{ AND } \|\nabla Y\| < T_e \\ \text{COLOR EDGE}, & chroma \geq T_c \text{ AND } \|\nabla Y\| \geq T_e \end{cases}$$

(Equation 2.)

(a)   (b)

(a)   (b)

(a)  (b)  (c)

Box 1. Pseudo-code for the joint operation.

192

Joint ( SubBlob *pSB1, SubBlob *pSB2)

1. Trace pSB1 to the root rtSB1;
2. Trace pSB2 to the root rtSB2;
3. Combine the two root nodes by adding attribute of rtSB2 to rtSB1 and in turn joining (works the same fashion as this one) two blobs if necessary;
4. Delete SBCore associated with rtSB2;
5. Link rtSB2 to rtSB1;

Box 2. Pseudo-code for the flatten operation.

194

Flatten ( SubBlob *pSB )
1. Trace pSB to the root rtSB while short-cutting the nodes with only one reference count (for example in A=>B=>C, B is only pointed by A. In this case A can be pointed directly to C bypassing B)
2. Start from pSB again and point all link pointers directly to the root node rtSB

METHODS AND APPARATUS FOR ANALYZING AND IMAGE AND FOR CONTROLLING A SCANNER

BACKGROUND OF THE INVENTIONS

1. Field of the Invention

The present inventions relate to methods and apparatus for analyzing images, and have particular application to analyzing scanned images, such as for identifying text.

2. Related Art

Large amounts of information are published or distributed to people in a printed format, such as in document form. The people originally receiving the documents may also have received digital or electronic versions of the information, but receiving information in both forms is not yet common. The person originally receiving the information may want to convert it to an electronic form. Additionally, others who may later receive the same documents may want to have the information in electronic form, such as for redistribution, editing or archiving. One common way of converting information on documents to a digital or electronic form is to scan the documents and store the resulting images.

Scanned images can be stored in any number of different formats, such as bitmaps, JPEG files, GIFs, and the like. The storage format may often be determined by the ultimate destination for the information. For example, information incorporated into a Web page may be stored in a different format than information incorporated into a word processing document, which may be different from the storage method for use in an audiovisual presentation. Additionally, information that is received only in all text form, or in text form combined with graphical or pictorial images, may be sent to a word processing application for editing.

In many instances, the destination for a scanned image determines how the image is initially scanned, such as the scan settings. For example, if an image is text only, the scan can be set to a low bit depth and high-resolution so that the image is best suited for Optical Character Recognition (OCR), reproduction and printing. For a graphical or pictorial image, the scan settings are more often set for a high bit depth and lower resolution. Therefore, if a person wants to put a text-only document into electronic or digital form, for subsequent editing, the scan settings should be a low bit depth and high-resolution. Therefore, before a preview scan of the image, and at least before any final scan, the scanner should be set at 300 dpi and black and white. The resulting image can then be processed, such as de-skewing, auto cropping and OCR.

Many image scanners include a user interface by which the user can select the desired settings. If the person knows what settings are necessary and knows how to apply them, the desired image data should be successfully received for later processing. However, if the person did not make the proper settings, the resulting digital data most likely will not be in the appropriate format for the desired end use of the data. For example, an image ultimately intended to be retrieved as an editable text document that is scanned with a low resolution and a high bit depth will not produce a data file that can be suitably processed through OCR.

Scanned images are often processed after scanning to make the images appear more like the original document. For example, a scanned text document which is intended to be displayed only as a picture or graphic depiction of the original may depict the text on a light gray or slightly yellow background because the digital data representing the background is not always given or assigned a zero value or other numerical value representing 100 percent white. Therefore, the image will not appear like the original. To improve the appearance, the image data file is processed to bring the background closer to white. Additionally, the image data file may be processed to make the text appear sharper. However, if the correct settings are not applied to the scanner, or if the proper destination for the digital data is not selected, the desired processing may not be carried out on the image.

Different hardware and scanners and different environments produce different scan results for a given image. For example, different digital values can be assigned to all black and all white pixels. Consequently, the point at which a pixel will be treated as white or as black may cause some pixels to be identified as black or white and other pixels to be a shade of gray. With color scanners, detected colors, including black and white may vary as a function of temperature and ambient light. An all black and white image may be converted to digital data that would be displayed with the light gray or light yellow background. Additionally, parts of the black text may be depicted as dark shades of gray. Consequently, if the image is not properly classified as black and white text, the image may not be properly processed, and it would not be displayed in such a way as to look like the original.

SUMMARY OF THE INVENTIONS

Methods and apparatus are provided which improve the likelihood that an image containing text will be properly classified. One or more aspects of the present inventions improves the possibility that analysis of the image produces the correct classification, both quickly and with little or no user intervention. In one aspect of the present inventions, images can be properly scanned as text only, graphic only or a mix of both without requiring any user input. A processor can make a determination of the proper scan mode, including proper resolution and bit depth, even without user input. The image can be properly classified even during or by the end of a preview scan, not only so that the proper settings can be applied to the scanner for the final scan, but also so that the data file can be placed in the proper format for its ultimate destination.

In accordance with one aspect of one of the present inventions, image analysis can be carried out by analyzing at least part of an image, such as a scanned image, to determine whether the image elements, such as a pixel, are black and white text or graphic. The image elements are grouped by type, and image elements that are identical or sufficiently similar in type and have sufficient proximity are grouped together. An indication is sent to the scanner controller as to how the image has been classified. For example, a processor may send a signal to the scanner controller that the image part analyzed is text only, graphic only or a mixture of text and graphic. In this way, a processor can be used to analyze and classify an image or a part of an image and to apply appropriate settings to the scanner for a final scan. Additionally, the classification of the image or part of the image can be communicated to the user through a user interface, for confirmation or to allow the user to make adjustments, further settings or the like.

In another aspect of one of the present inventions, a threshold value for what image elements will be treated as all white or all black can be determined dynamically. For example, as a scan progresses, the background of the image may change slightly, the ambient light or the equipment temperature may change slightly and affect the image scan. By dynamically adjusting the threshold value for black or white, these variations can be taken into account so that the resulting file is a closer representation of the original image.

In a further aspect of one of the present inventions, gradient analysis is used to help identify whether an image is changing between dark and light. The gradient analysis helps to define boundaries in the image, which also helps to group identical or sufficiently similar image elements.

In accordance with another aspect of one of the present inventions, an image or parts of an image can be analyzed even while the scan is progressing. For example, data from a scan can be received by a processor on a line-by-line basis or in strips with groups of lines as the preview scan or original scan progresses. The real-time analysis is especially helpful in identifying images that are a mixture of text and graphic, and therefore would not be scanned or processed as text only or graphic only. In such a case, for example, the image analysis can be immediately terminated and the image data sent directly to the processor for final processing and/or output to the ultimate destination. Such an image would not be a candidate for text only or graphic only processing.

In another aspect of one of the present inventions, part of an image classification may include classifying an image element or pixel as white, white edge, gray, gray edge and black. These classification labels may be particularly helpful in identifying text-only images. In one form of one aspect of the inventions, the pixels may be classified using a gray scale method and in another form they may be classified using a chroma method. The pixel classification may be made with any desirable tolerances, as selected by the person designing the software. For example, pixels of wider varying characteristics can be classified into a relatively few classifications, so that pixel detail is ignored, lost or discarded in favor of fewer classifications. Alternatively, the larger number of pixel types can be accounted for by having more classifications. In either case, the grouping of image elements by type can be carried out as tightly or loosely as desired, and the method may depend on whether the tight thresholds are set either early in the process at the pixel classification stage or later during the grouping. For example, pixel anomalies, such as a single lighter pixel in a group of dark pixels, can be classified more loosely as a black pixel along with the adjacent pixels by setting a wider range or different threshold than otherwise. Thereafter, all the pixels could be grouped as text, for example. Alternatively, the lighter pixel could be classified differently than the surrounding pixels with more precision, and thereafter grouped with them by setting a lower threshold or cut-off for the number of dark pixels in a region that are used to make an all black region.

In a further aspect of one of the present inventions, components of the image can be connected so as to create regions, groups or aggregation's of pixels that have been assigned an identical classification. In one form, pixels are grouped according to two different levels, such as background versus non-background. In another form, they may be classified as black, gray, gray edge, color, color edge, white, and so on. These latter classifications may be sub-classifications, and if a majority of the pixels have been assigned a single sub-classification, they may be classified as text-only pixels. Otherwise, they may be classified as graphic or pictorial.

The evaluation of an image may be done on a pixel-by-pixel basis to determine whether or not the pixel it is black and white or graphic.

These and other aspects of the present inventions may be considered further in conjunction with the drawings, a brief description of which follows, and the detailed description of the preferred embodiments.

BRIEF DESCRIPTION OF THE DRAWINGS

FIG. 9 is a block diagram and graphical representation of a gradient computation using Sobel masks.

FIG. 10 is a depiction of a system of equations for use in pixel classification by luminence and chroma.

DETAILED DESCRIPTION OF THE PREFERRED EMBODIMENTS

Figure 1:
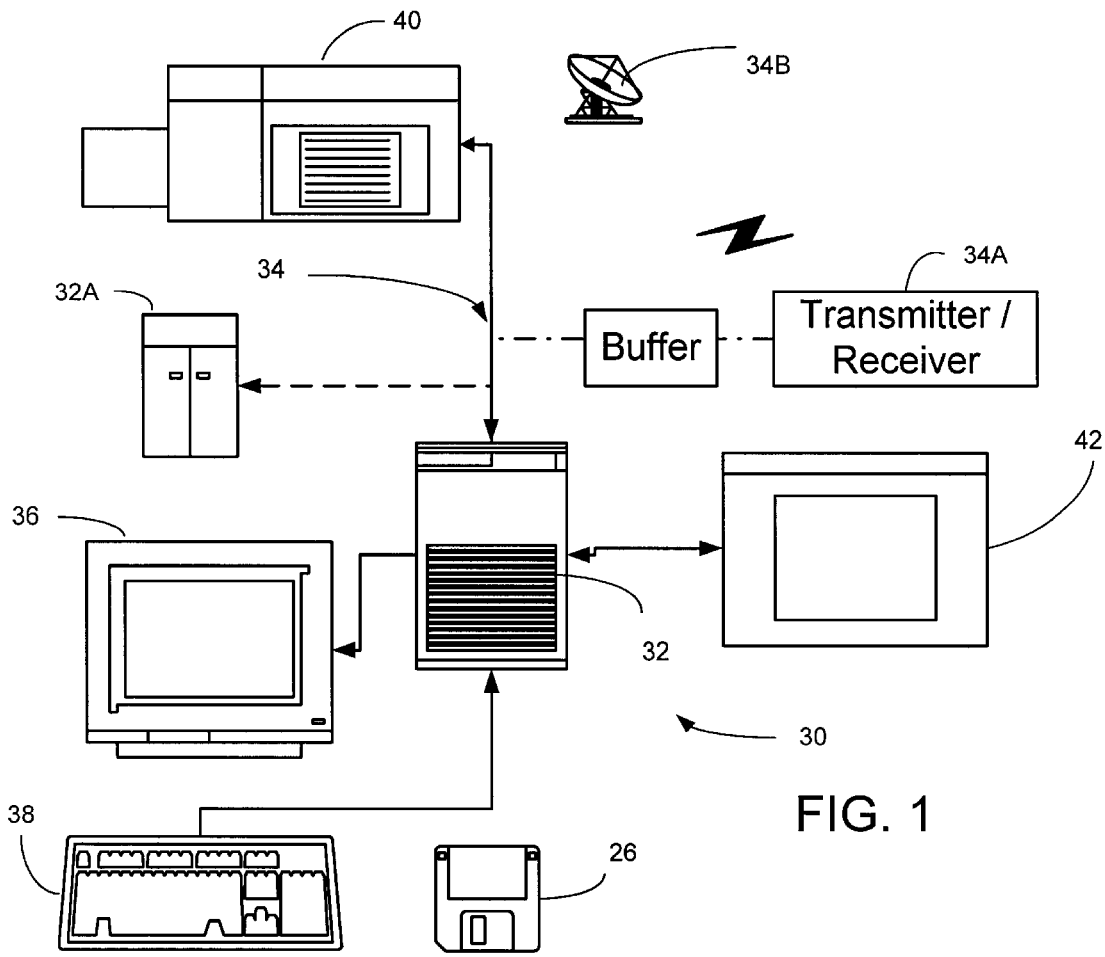
FIG. 1 is a schematic diagram of a system for analyzing images and producing an output for peripheral devices or modified data files for subsequent use, in accordance with several aspects of the present inventions.

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

Methods and apparatus are described for analyzing images having particular application to analyzing scanned images in order to reliably identify text and identify graphic. The proper identification of text is relevant to ensuring that the data from the scanned image is in the most desirable form, such as high-resolution and low bit depth. If the image data is not in the most desirable form, the image can be re-scanned with the scanner set with the desirable settings, or the image data may be in a form that can be processed and placed in the desired form. Proper identification of an image is also relevant to ensuring that the data from the scanned image is in the most desirable form for output to a peripheral device or later processing in a specific application, or conversely, to ensure that the data is being sent to the device or application that can best process it. Proper identification of graphic images is also important for similar reasons. For example, pictorial data may need to be enhanced or modified prior to display or output, making it relevant to ensuring that the full dynamic range of the data is available.

The methods and apparatus described make easier the proper setting of a scanner for acquiring image data corresponding to an image of a given type. Where the image is analyzed and classified according to a particular type, the image can then be scanned to acquire image data having the most desirable form for the particular image type. Moreover, the image analysis and classification and subsequent scanning can be carried out with little or no user intervention, for example using pre-established settings correlated to known image types. Once the image type is known, the proper settings can be applied to the scanner and the desired image data acquired and stored or sent to the appropriate destination. Alternatively, an image can be scanned once using optimum settings for as many likely formats as possible, after or during which the image will be classified. Once the image is classified to a suitable level of certainty, the image data could be transformed to a form suitable for the intended destination.

It should be understood that the reference to an image and image data corresponds to all or any portion of an image on a document or other medium. For example, many documents include only one type or class of image, such as text only, or graphic only. Documents also may include a mixture of these two on the same page, such as graphic image in one region of the page and text only in another region of the page. Additionally, text can appear in an image as part of a graphic image, and users may have no desire to convert the text/graphic image to another form, such as pure black and white text to be edited. Therefore, reference to an image and image data may correspond to all or only part of the content of a document or other medium. It is intended that one or more aspects of the present inventions can operate on all parts or only portions of images.

The description of the methods and apparatus of the present inventions will focus primarily on their application to scanners and image data acquired through a scanning process. They have particular application to the use of scanners for scanning or copying documents, especially to identify an image that is text only or predominantly text, but it should be understood that one or more aspects of these methods and apparatus may also be suitable for other applications, such as analyzing and characterizing data files that have been previously scanned or created in such a way that any differentiation between all text and all graphic no longer exists. Therefore, these inventions should not be limited to the specific preferred embodiments discussed.

In accordance with one aspect of the present inventions, a system 30 (FIG. 1) for analyzing, characterizing or classifying an image may include a processor or a CPU 32 for receiving and processing image data or a portion of image data to be analyzed. The processor may also include a storage device for storing data as a default if no other destination is selected by a user or established as a default, or the image data may be stored remotely. Image data can be sent over a network or communications link 34 to a display, viewing or projection device 36, which can be a color or black and white monitor or other viewing device. A keyboard 38 or other input device, such as a mouse, may be used to send commands or input data to the processor 32. For example, the keyboard can be used to select or confirm settings for a scanner 40 linked or otherwise in communication with the processor 32 over the network 34, or to select one or more destinations for the data. The system may also include a printer or other output device 42 for receiving image or other data from the network 34. The scanner and printer may be a combined unit, or acting as a combined unit, for example to function as a copier, and other configurations are possible as well.

The scanner 40 may be a conventional flatbed scanner, a continuous feed, sheet-fed or scroll-fed scanner or other media-transport device that can sense information on a medium, such as on a document. The particular mode of acquiring data from the medium can take any number of forms, but the discussion of the present inventions will focus primarily on document scanners using light to acquire data representing an image on the document.

Figure 2:
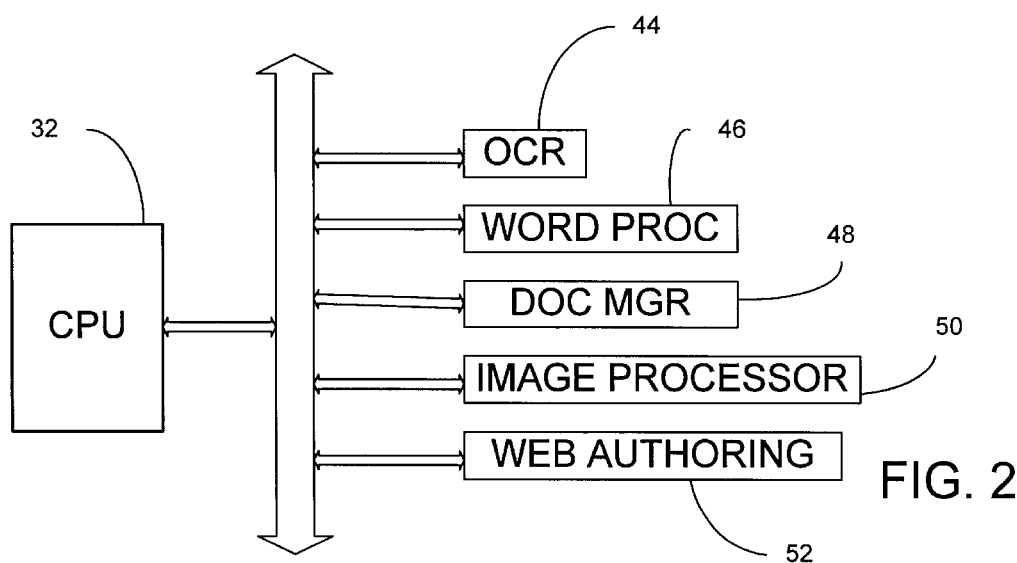
FIG. 2 is a schematic block diagram of a system for analyzing images and destination applications for receiving a data file.
Figure 3:
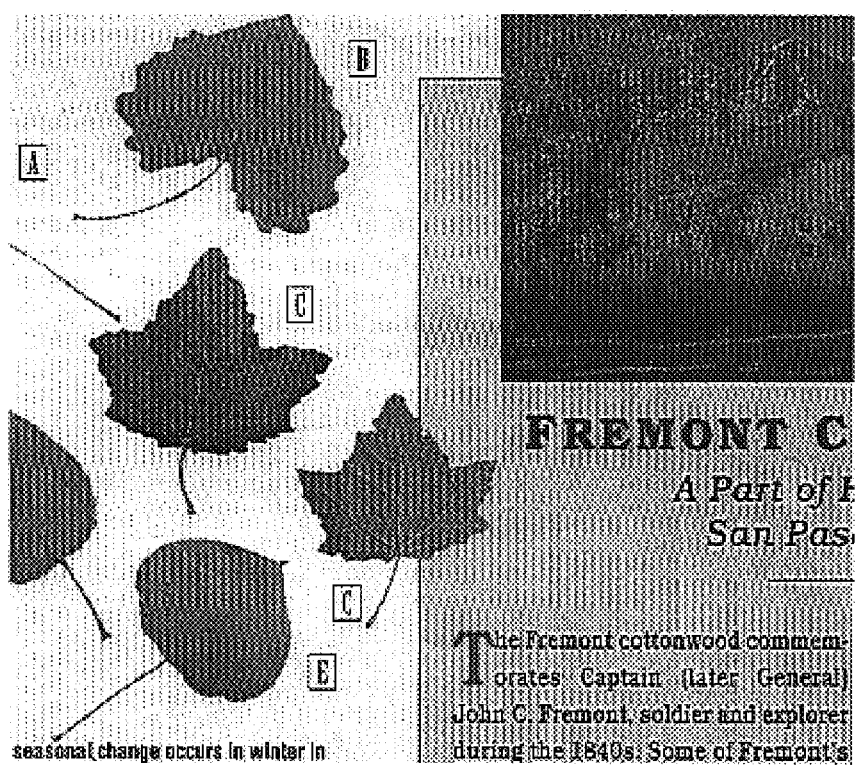
FIG. 3 is a representation of a sample image that may be analyzed with the methods and apparatus of the present inventions.

There are a number of destinations to which the CPU 32 (FIG. 2) could send the image file, including an OCR application 44 to convert the image file to a text or other editable data file, that can be processed with a generic or other word processor 46, or a document program such as Microsoft Word 48, which can receive editable text as well as pictures, symbols, and other image files. The CPU 32 can also send the image file to an image processing program 50 such as Microsoft Paint, Adobe Photoshop, or the like. Other applications programs may include Web authoring tools 52, presentation programs such as PowerPoint, and the like. These destination applications have optimum data input formats, and the CPU 32 automatically, or based on input from the user, preferably establishes the appropriate settings for the scanner 40 so that the image data file sent to the applications programs will be in the appropriate configuration. Preferably, the CPU 32 sets the scanner 40 to acquire the data corresponding to the image at the proper resolution and bit depth necessary for optimum processing by the applications program. The CPU 32 can establish the proper settings based either on input from the user, based on the image analysis described herein, or through other means. Alternatively, the scanner can be set for optimum data acquisition corresponding to any possible image format and the CPU 32 can then process the image data file to convert it to the optimum format acceptable by the application program. For example, the image file can be configured so as to be optimized for text only for an OCR application, for text as an image, for photo applications with appropriate color and/or gray scale information or mixed for photo and text with appropriate color and/or gray scale information.

Figure 4:
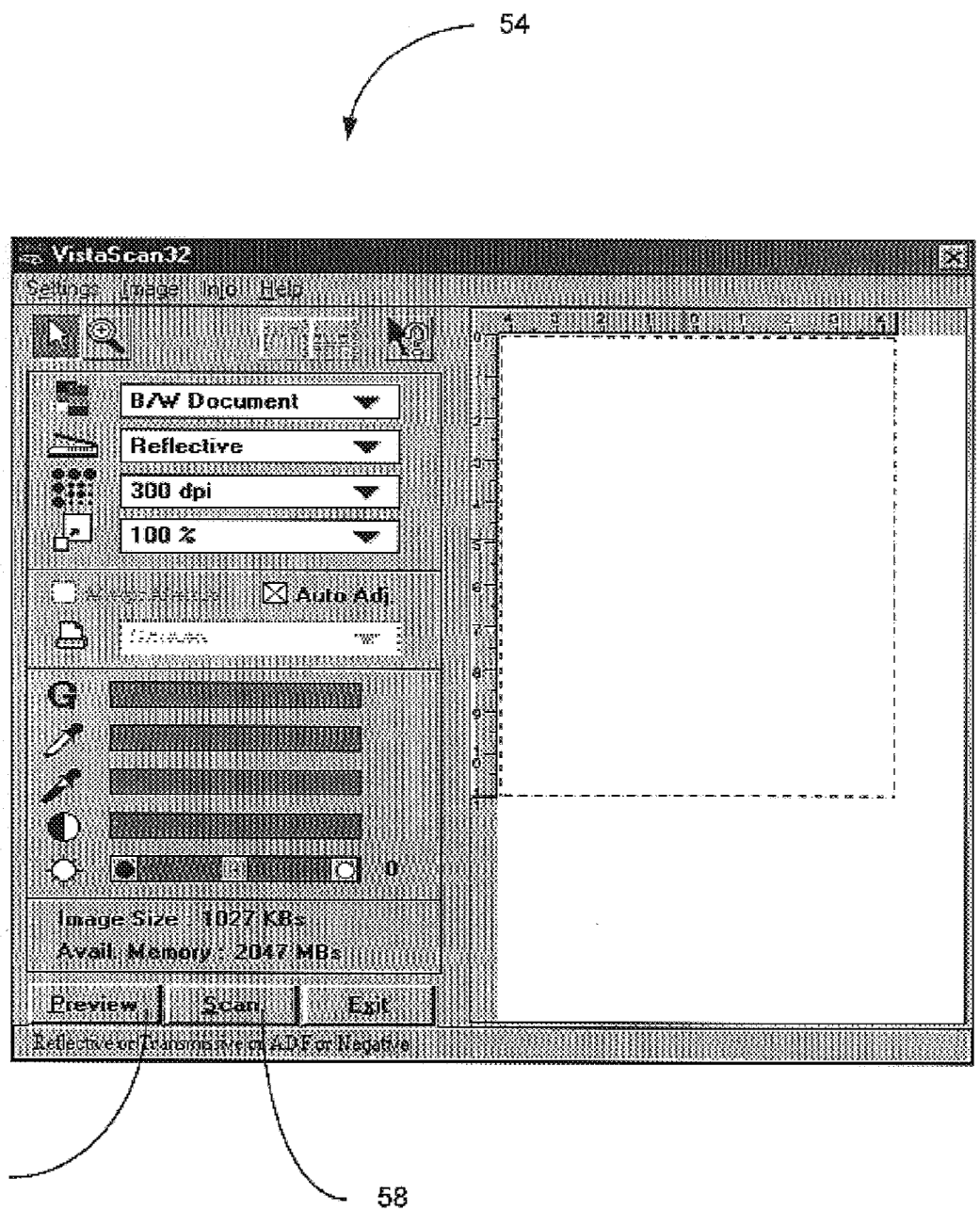
FIG. 4 is a representation of a user interface for an image scanner which allows various levels of user control over the settings and the scan of an image.
Figure 5:
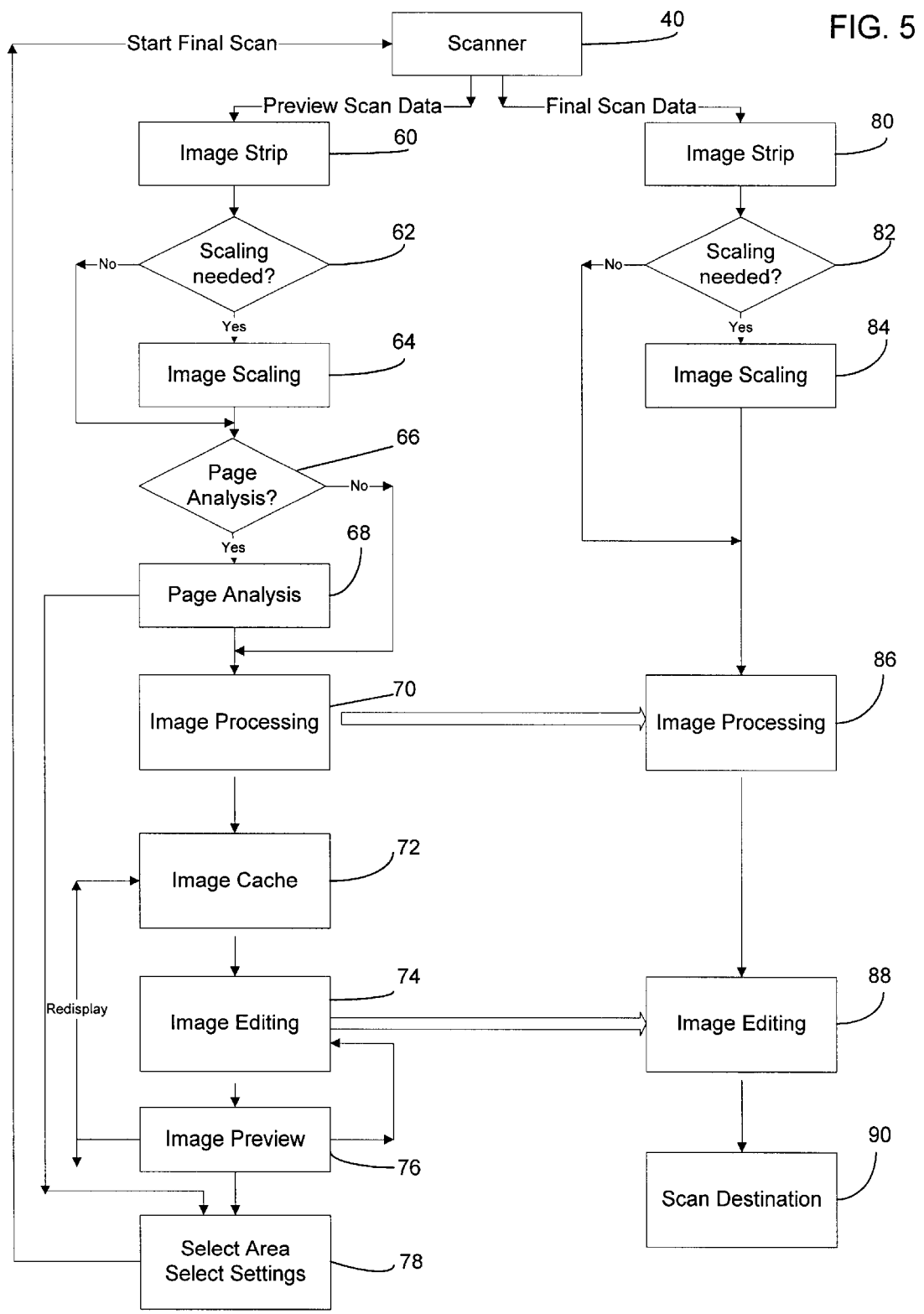
FIG. 5 is a flow chart depicting an example process followed by one aspect of the present inventions for scanning and analyzing an image.

Considering in more detail an example of a scan sequence, the scanner 40 (FIG. 5) may come with software or otherwise include a user interface 54 (FIG. 4) which may be used to select a preview scan 56 and a final scan 58. The user interface 54 is conventional, and preview and final scans are well-known. On the preview scan, preview scan data is fed from the scanner 40 to the CPU 32 in the form of one or more image strips 60 (FIG. 5). The image data can be received and processed by the CPU 32 in segments, blocks or strips as the scan is progressing, and even on a line-by-line basis, so that the image analysis and characterization can be carried out real-time. Each image strip is preferably fed to the CPU real-time as the scan is progressing, and is preferably multiple lines long. For example, each image strip may represent a percentage, such as 25 percent, of the entire image to be scanned, and may be several hundred lines worth of image. The size of the image strip may be determined in part by buffer size and the like.

In one preferred form of the inventions, the data can be processed by the CPU 32 as though all the data received after a start code or instruction and before a stop code or instruction is received is treated as a single image, even if the data is received in blocks or slices of data. For example, the CPU 32 can be instructed to begin processing upon the receipt of the first group of lines of image, for example 25 or 100 lines. The CPU can continue processing each additional line or each additional group of lines in sequence until the end of the image is received. Alternatively, the CPU 32 can control the image analysis by controlling how image segments are fed into the image analysis process, the block or slice size processed, or in other ways.

In some circumstances, the image can be properly classified even before the scan has finished. For example, if the image is classified as mixed, e.g. a mixture of text and photo, part way through the scan, so the image will not be classified as either all text or all photo, according to the criteria for making such a classification, further analysis of the image may be unnecessary. The image data can then be sent to the CPU 32 for appropriate disposition outside of the image analysis and characterization process. While the image data can be received, analyzed and characterized after the scan has finished, real-time or segmented analysis is preferred in order to reduce the overall time used for processing the image data.

The CPU checks 62 to see if any scaling is necessary, in which case the image is scaled 64 to the appropriate size for further processing. If no scaling is necessary, the image scaling step 64 is bypassed.

The CPU then checks 66 to see if a page analysis is to be carried out. A page analysis may not be necessary if the user has manually entered settings for the scanner based on knowledge of the image to be scanned, or if the proper settings have otherwise been set for the scanner, for example. The page analysis 68, described more fully below, is carried out if it is not bypassed, and the results are used by the CPU to process the image in an image processing step 70. The results of the image processing step 70 are stored in an image cache 72 for subsequent processing 74, such as for sizing, sharpening, tone adjustment and the like. The processed image is then provided to the user interface 54 in an image preview step 76 followed by further editing 74 by the user or approval and storage in the image cache 72 if there are no further changes. When the last preview is approved, the image area is established and the scan settings are established at 78 and the processor returns to the scanner 40 for a final scan.

On a final scan, each image strip 80 is sent to the CPU and checked 82 for any necessary scaling. Scaling is done at 84 followed by image processing 86, as necessary, and any image editing 88, after which the image is sent to the scan destination 90. Scanning can then be terminated or repeated, as desired.

It should be noted that having a preview and final scan sequence are relatively traditional. However, it is possible that the preview and final scans can be collapsed into a single series of steps, including scaling analysis, page analysis, image processing and editing, image preview followed by possible further image editing and final delivery to a destination. Other combinations of steps are possible as well. For example, as the first scan, the image may be scanned at the maximum optical resolution and maximum depth supported by the scanner, and the image saved in a cache. The resolution and/or depth is then reduced to create the preview image. When a final scan is requested, the image in the cache may be processed to get the desired result, instead of starting a new scan at the optimal settings for the image type. This approach may be used when the scanner does not support a preview/final scan sequence, for example sheet-fed scanners that eject the sheets on which the images are found.

Figure 6:
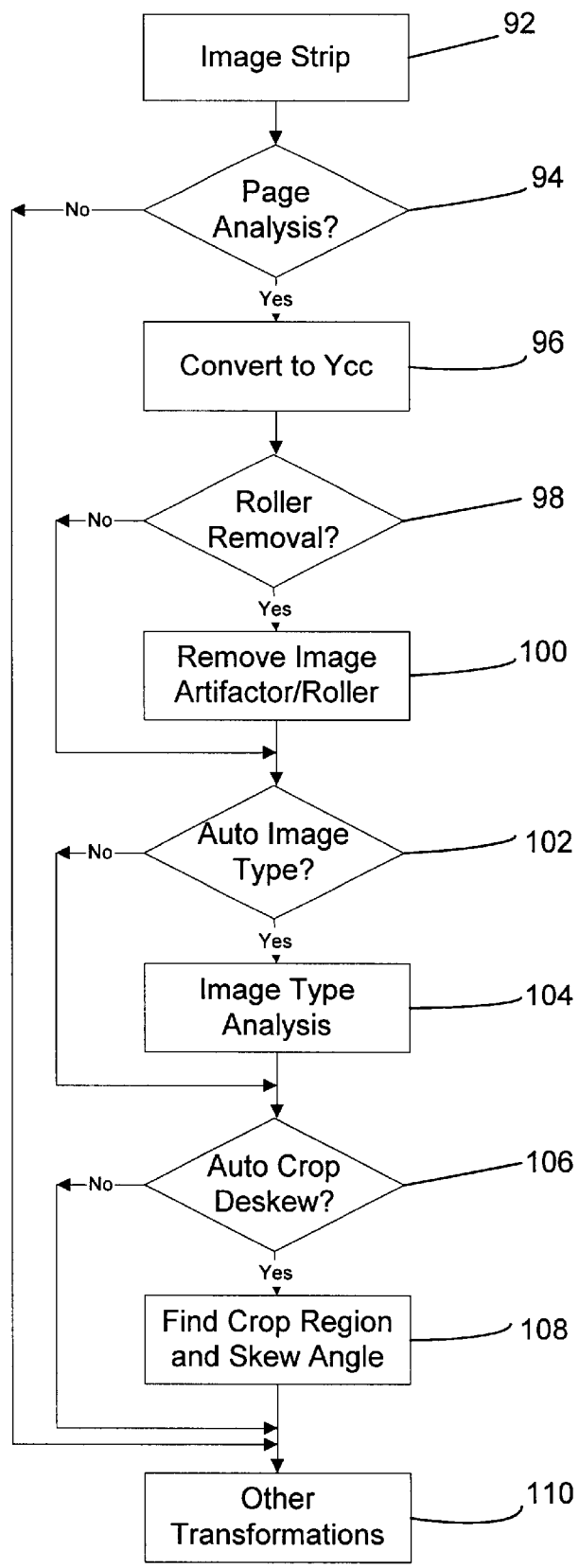
FIG. 6 is a flow chart depicting steps of a method that can be carried out on an image, including analyzing the image for text and graphic.

Considering the page analysis and editing process in more detail, an image strip 92 (FIG. 6) such as that described above is fed to the CPU 32. The CPU checks 94 to see if a page analysis is to be carried out, and if so, the CPU converts 96 the image data to luminance form, using, for example, the established RGB (Red, Green, Blue) conversion factor $0.299*R+0.587*G+0.114*B$. This is the conversion factor that is conventionally used with the "sRGB" standard. If page analysis is not to be carried out, the CPU skips the luminance conversion step. The CPU then checks 98 to see if any roller artifacts need to be removed. Roller artifacts may be present in a sheet fed scanner where the sheet may be smaller than normal size. Roller artifacts are removed 100 if present, after which the CPU checks 102 if the page analysis and characterization process is to be applied to the image strip. If so, the image strip is analyzed 104, as described more fully below, and if not, the image type analysis step 104 is bypassed. The CPU then checks 106 to see if the image needs to be auto-cropped or de-skewed, and if so the image is processed 108 accordingly. The CPU then carries out other transformations 110, as appropriate.

In a process in accordance with one aspect of the present inventions, once the appropriate hardware configurations are set or available, as desired, the image or portion thereof is acquired and made available to the CPU 32. As previously noted, the use of the term "image" refers to all or part of an image on a document or other medium that is to be analyzed. Additionally, data representing the image can be acquired in any number of ways, including through a scanner 40, through a communications link, or the like. Moreover, the image data file can be acquired in segments or as one complete file of the entire image under consideration. Once the image is acquired, it can be processed and analyzed as desired.

Considering the image analysis and characterization step in more detail, in one form of a process for analyzing an image and characterizing the image as text only, picture or graphic only, or mixed, image data is received and elements of the image are classified, preferably on a pixel-by-pixel basis. In one preferred embodiment, each pixel is classified as either white, black or color using an appropriate standard. In most of the embodiments under consideration, the image analysis and characterization is carried out with one purpose being the identification of text-only images.

The pixel image data is also analyzed to identify appropriate relationships between pixels, especially those pixels adjacent to each other. In one preferred embodiment, pixels that are adjacent each other and that have the same classification, such as black, white or color, are then grouped, aggregated or linked to each other and identified as connected regions, sometimes referred to as blobs. In the preferred embodiments, the classification of parts of the image as being related is intended to recognize and take advantage of the fact that related parts of an image will have identical or similar characteristics. For example, regions of all black and white text will share the characteristics that the pixels will be either black, white or relatively sharp or steep transitions between those two extremes, whereas pictorial or graphic regions, represented in gray scale, will have substantially more gray areas, softer or smoother transitions between light and dark and comparatively fewer black and white pixels. Therefore, in the preferred embodiments, the pixels are not only analyzed for their content but also their relationship to adjacent and nearby pixels.

As an additional step in one preferred aspect of the inventions, the different classifications are added, counted or otherwise evaluated to determine the relative magnitude, percentage or other measurement criteria corresponding to each of the different classifications. For example, the number of black regions or blobs, the number of white regions or blobs and the number of graphic regions are counted, and if the number of white and black regions is significantly higher than the number of graphic regions, according to the cutoff or threshold set or established in software or otherwise, then the image can be classified as black and white text. For example, in one preferred embodiment, if the number of black and white regions constitutes 95 percent of the image, the image will be classified as black and white text. If the number of black and white regions constitutes less than 5 percent of the image, the image can be classified as graphic or pictorial. If the number is between five and 95 percent, the image can be classified as mixed. Other thresholds and classifications can be used, as determined by a designer, and may depend on the types of images expected to be scanned or analyzed, the permissible tolerances or percentages desired, and the like. The thresholds or cutoff of five and 95 percent may be different, depending on what the designer selects as preferred criteria.

Once the image is properly classified, the CPU 32 has additional information useful for additional processing of the image. In one preferred embodiment, the CPU applies settings to the scanner 40 that are optimum based on the type of image being scanned. The scanner then carries out a final scan, during which the image data may or may not again be analyzed, and the image data from the final scan received by the CPU. The CPU then either stores the image data or sends it to the desired destination. Alternatively, or in addition to setting the scanner, the image classification developed by the CPU can be displayed on a user interface 54 (FIG. 4). The user can then affirm the classification determined by the CPU, request another preview scan 56, change one or more settings or start the final scan 58.

By analyzing and characterizing the image, the system can better ensure that the scan settings are proper and that the resulting image data is in the best possible form for the ultimate destination. Characterizing the image can be done without user input, and allows proper acquisition of the data more quickly.

Figure 7:
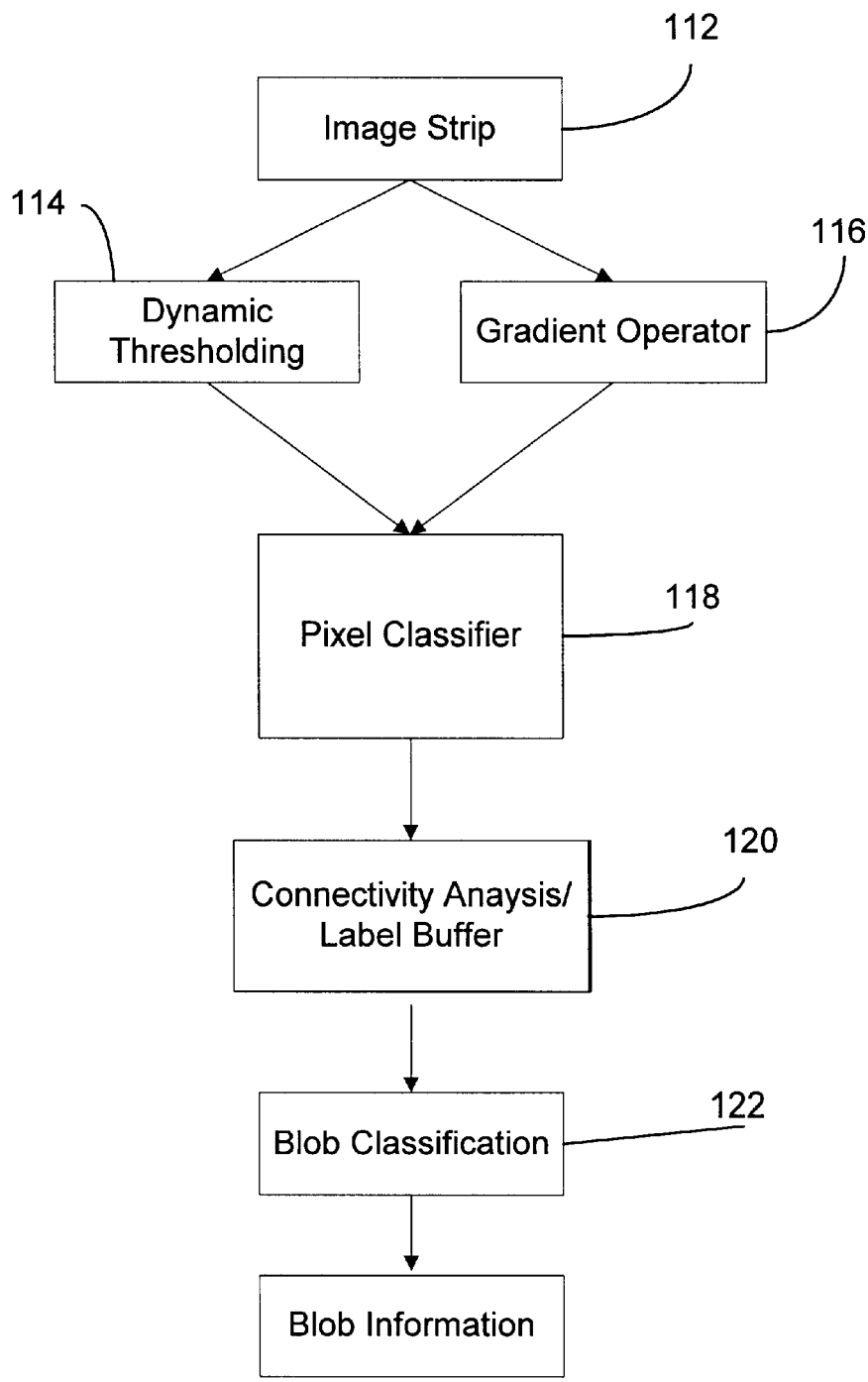
FIG. 7 is a flow chart depicting steps in a method for image analysis in accordance with one aspect of the present inventions.

Considering the image type analysis step 104 in more detail, an image strip 112 (FIG. 7) has been converted to luminence form. In the preferred embodiment, the image data is then processed line-by-line, and preferably on a pixel-by-pixel basis, to analyze and classify each pixel, and, if possible, to group the pixels. The image data is checked for background levels so that digital values corresponding to true white and true black can be established. These values can remain fixed for the entire image or may be dynamically established 114 over the image. In the preferred embodiment, the CPU receives a dynamic range and white point value to establish 114 a threshold value for what will be considered white and a threshold value for what will be considered black. In the preferred embodiment, the threshold is taken as 0.95 times the value corresponding to white pixels, as determined by the Kittler-Illingworth algorithm, or generally the value of the maximum or minimum digital value of the pixels in a line or series of adjacent lines. Digital values in between will be assigned different gray scale values, and gray values may be assigned using a similar threshold determination, such as anything between 0.5 and 0.95 times the value of the white pixels, as determined by the Kittler-Illingworth algorithm. Black may then be anything equal to or below 0.5. Other or different thresholds may easily be set based on empirical factors, and the like.

The CPU uses a gradient operator 116 to determine if a given pixel represents or is immediately adjacent an edge. The processor checks to see if the data is going from light to dark or dark to light and provides a representation as to the amount of change and the direction of change. The direction of the change will indicate whether the data is going from light to dark or from dark to light. The processor then determines whether or not the change is significant or large enough to represent an edge or is slight enough to represent the more gradual changes present in photo or graphic images.

The threshold or thresholds established by the processor and the gradient values corresponding to the pixels in the line being analyzed are then used by the processor to classify 118 each pixel. Using the threshold and the indication of whether or not the pixel is on an edge, the processor decides whether each pixel should be classified as white, black or gray or color. If the pixel is above the threshold, it will be classified as white, and if it is at a digital value at the other end of the spectrum (below the gray threshold), it will be classified as black. If it is in between, and the gradient value is small (below the gradient threshold, such as below 30) or otherwise indicating a gradual change, the pixel is classified as gray scale or color. The classification of each pixel is then stored, along with the gradient value, if desired. Additionally, each pixel can be assigned one of more than three values, in other words intermediate values in addition to black, white or gray or color. For example, possible labels for each pixel may include dark gray, light gray, black, white, color, gray edge, color edge or other useful classifications. The labels or classifications and their number may depend on what the classifications ultimately will be used for and the desired quantity and precision desired for the data.

Preferably after the pixel classifier, the processor analyzes 120 the connectivity or relationships among pixels to identify connected regions or areas of pixels that can be classified the same or sufficiently similar to represent one type of pixel. For example, if one or more pixels immediately adjacent a given pixel has the same label, or a label that is sufficiently close to be characterized as the equivalent, those pixels will be grouped, separated or otherwise combined into one class, region type or other classification. For example, all adjacent pixels labeled black may ultimately be identified as text, especially if there are a significant number of adjacent pixels that are labeled white. However, if those pixels labeled black are in or surrounded by regions of different gray scale levels, those pixels as well as the gray scale level pixels may be identified as a graphic or pictorial region, and possibly graphic text. The analysis is preferably based on the statistics of an area as opposed to a statistical analysis on individual pixels. Preferably, regions can then be labeled as text and graphic or some other useful characterization.

With the information from the connectivity analysis, the processor can then classify 122 each region or blob. The processor can then tabulate, sum or otherwise account for the relative numbers of text, graphic or other classifications of regions. The processor can then evaluate whether the page analysis should continue or if the image data should be sent directly to the user interface or otherwise processed further. For example, if the analysis of the image strip 112 reveals that the image is all text or all graphic, the page analysis would preferably continue to determine if the rest of the image contains a significant number of pixels of the other type. If the analysis of all of an image reveals that an otherwise all text image also includes a significant amount of graphic near the end of the image, the image will be classified as mixed. Likewise, if the analysis of all of an image reveals that an otherwise all graphic image also includes a significant amount of text near the end of the image, the image will be classified as mixed. Conversely, if the image is all or substantially all of one type, it will be classified as such, and the processor will continue. For example, the processor will conduct a final scan with the appropriate settings, or the processor may send the image data to the appropriate destination. If the scan was the first and final scan, the processor may convert or otherwise process the image data to place it in a form suitable for the selected or appropriate destination. For example, the data may be converted to a text only format for processing in an OCR application or if it is converted to graphic, it may be sent to a graphic or photo application.

In the preferred embodiment, if the processor determines early in a scan that the image is mixed, in other words that the image has a significant number of pixels classified as text and a significant number of pixels classified as graphic, the processor can immediately classify the entire image as mixed and discontinue the image analysis. The ability of the processor to make such an early determination is made easier by analyzing the image in strips or segments. Alternatively, the processor may continue, for example if it has the capability of isolating text blocks within an otherwise graphic image or for other processing.

Where the image data is from a preview scan, the image analysis may indicate that the image is text only. The processor may, for example, set the scanner for 300 dpi with an eight bit gray scale and conduct a final scan. Where the image data is graphic, the processor can set the scan resolution for 150 dpi and a 24-bit color scan. The results may be sent to the user interface and request confirmation from the user. The user may change settings, change the image area, set the same parameters for repetitive scanning or make other changes. Alternatively, the final scan can be done automatically.

Various methods can be used to group or classify regions, but one preferred method is to establish a threshold or thresholds to allow calculation or automatic classification of an image as text only, graphic only or mixed. In one preferred embodiment, if an image is both more than 95 percent text and the amount of image that is not text is less than one square inch, the image is classified as all text. Use of these dual criteria is preferred to take into account the possibility of scanning relatively small documents, such as business cards or other small images. However, if the image is either less than or equal to 95 percent text, or more than one square inch of graphic, the image is not classified as all text. Where an image is determined to be other than all text, the image will be classified as mixed if it includes both text and graphic. For example, if the image includes graphic and at least five percent text, it may be classified as mixed. However, if the image is determined to be other than all text, and the image has less than five percent text, the image may be classified as all graphic. Other thresholds can be used, and they can be determined based on a number of different factors, such as the anticipated volume of text versus graphic documents that is likely to be experienced, the relative percentages of text versus graphic within typical documents, common font sizes used in text, artifacts that may be expected from typical documents, the sizes of images to be scanned, and other empirical factors. Additionally, single or more than two criteria can be used, as desired.

Page analysis is also helpful for other image processing. For example, image analysis can help in ranging determination for image data, which will produce different results for graphic as for text. During auto-crop or de-skew processing, the data available for processing will be different for image data scanned as text compared to image data scanned as graphic. Additionally, boundaries of an image determined during image analysis may also be helpful during the auto-crop and de-skew processes. Therefore, image analysis and characterization may help to make the auto-crop and de-skew processing more accurate and reliable. Moreover, the auto-crop and de-skew processing can be carried out automatically in some instances, without manual input.

Page analysis and characterization helps to insure proper scan settings for image processing. In accordance with one or more aspects of the present inventions, the analysis and characterization can be carried out quickly and efficiently, even without user intervention. The page analysis and characterization can be done automatically, so the user can elect to use the defaults established for the processor and the scanner given the particular image being scanned. The methods described also take into account variations in equipment and environmental conditions so that consistent and reliable results can be obtained. The page analysis and classification also helps to increase the probability that the image data will be sent to the correct destination in an optimum format.

In one preferred form of the inventions, the page analysis includes a page segmentation process by which parts of the image can be identified, such as text only parts, photo or picture only parts, or other designations. For example, the page segmentation can divide an image into connected components of text, graphics and picture, and background independent of orientation and layout. The page segmentation can also be done on raster-scan mode data input/output using rotational buffers. In a preferred embodiment, the page analysis uses pixel attributes and interconnection to achieve page segmentation that is independent of orientation and layout.

In one preferred form of the page segmentation analysis, the process uses three sequential steps, which will be called pixel classification, hierarchical connected component (HCC) analysis and region or blob classification. Each of these steps will be described.

Pixel classification preferably identifies or uses image features to distinguish text from other data. In the preferred embodiment where the image data is analyzed in gray scale form, those features are representations of black and white values, edge elements, and the balance, which will be called gray. In an embodiment where the image includes color data, the features used to classify each pixel may be black, white, gray, edges and color. Other features or image characteristics may be used to differentiate parts of the image, but it is believed that these are particularly appropriate for many of the images that would be encountered in ordinary practice.

Figure 8:
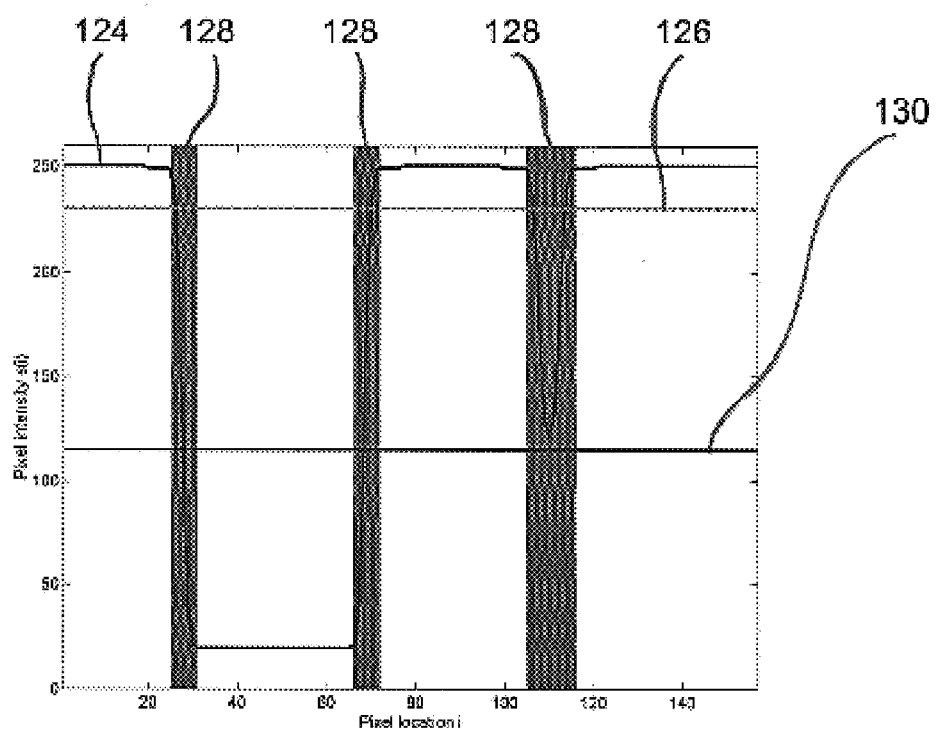
FIG. 8 is a profile of modeled black text on the light background.

For gray-scale scanned images, black text of various font sizes on a light background could be modeled by a relatively few discreet curves such as those shown in FIG. 8, which is a profile of a modeled black text on a light background. The curve 124 represents a one-dimensional profile. The profile in FIG. 8 can be divided into four sections, namely:

white background with luminance above the line 126 (white threshold);

transition section marked by the gradients or vertical line areas 128;

black interior part with luminance below the line 130 (gray threshold); and gray section with luminance in between the lines 126 and 130.

Text of relatively small font size (such as smaller than 8-point, for example, depending on image quality and scan resolution) is characterized by all-transitional area with little or no black interior part. In the preferred embodiment, the histogram-based thresholding algorithm of Kittler-Illingworth [described in J. Kittler and J. Illingworth, "Minimum Error Thresholding", Pattern Recognition, Vol. 19, No. 1, 41-47, 1986] finds a suitable white threshold, while half of the white threshold represents a suitable gray threshold. The transition area can be identified by a gradient norm (calculated by $|s(i+1)-s(i-1)|$ in FIG. 8) with a threshold setting of about 30. In the example shown in FIG. 8, the white threshold has been set at about 230, and the gray threshold has been set at about 115.

It should be noted that several overlaps occur between the quantization of luminance and gradient (the transitions between luminance values) in FIG. 1, so that in the transition area, a pixel could possibly be classified as one type or another, depending on how the pixel characterizations are established. In one preferred embodiment, gray pixels with high gradient are grouped with black pixels since they are most likely to belong to black text. White pixels with high gradient are grouped with white pixels in order to reduce the chance of connecting text to graphical objects. The classification of black pixels with high gradient is mostly a matter of enhancement. In one preferred embodiment, these pixels are characterized as black pixels. In another preferred embodiment described below, high gradient gray pixels can be assigned their own label, such as gray edge or white edge, but in a basic black and white text analysis, WHITE, BLACK and GRAY labels are sufficient for many applications.

For evaluating two-dimensional images or other image portions, a preferred pixel classification scheme can be represented by Equation 1, where $T_w$ and $T_g=0.5 \cdot T_w$ are the white and gray thresholds, respectively, $\|\nabla Y\|=\sqrt{G_i^2+G_j^2}$ is the gradient norm calculated by using two 3×3 Sobel operators 132 and 134 shown in FIG. 9 [described in Rafael C. Gonzalez and Paul Wintz, Digital Image Processing, second edition, Addison-Wesley, Reading, Mass., 1987], and $T_e$ is the edge threshold.

$$C(Y, \|\nabla Y\|) = \begin{cases} \text{WHITE}, & Y \geq T_w \text{ AND} \|\nabla Y\| < T_e \\ \text{WHITE EDGE}, & Y \geq T_w \text{ AND} \|\nabla Y\| \geq T_e \\ \text{GRAY}, & T_g < Y < T_w \text{ AND} \|\nabla Y\| < T_e \\ \text{GRAY EDGE}, & T_g < Y < T_w \text{ AND} \|\nabla Y\| \geq T_e \\ \text{BLACK}, & Y \leq T_g \end{cases} \quad \text{Equation 1}$$

(Pixel classification by luminance only.)

The value of $T_e$, for example, may be about 50 or could be lower such as 40 or below, or higher. The labels "WHITE EDGE" and "GRAY EDGE" are for content-based enhancement. For the purpose of segmentation, WHITE also could be assigned to pixels of WHITE EDGE and BLACK to that of GRAY EDGE.

The luminance-only approach is also applicable to color images and achieves useful results for applications such as text/non-text layer separation for compound document compression. However, for a text enhancement application, identification of black text is preferably given precedence. For color images, a metric of colorfulness is used. The YCrCb color space is used, and the chroma is calculated from the formula chroma=$\sqrt{C_r^2+C_b^2}$. Although this color metric is easier to compute, this color metric achieved very similar results to the chroma calculated from the formula chroma=$\sqrt{(A^*)^2+(B^*)^2}$ calculated in CIELA*B* color space. The pixel classification scheme using luminance and chroma is characterized by Equation 2, depicted in FIG. 10, where Tc is the colorful threshold. Where color images are processed using a metric for colorfulness, Tc may be about 15, for example. It should be noted that the pixel classification and consequently the page segmentation can work on luminance-only attributes by setting Tc to 255. These thresholds provide a suitable pixel classification in many applications. However, it should be understood as to all of the thresholds given as examples that they can be adjusted up or down as desired to achieve desired results, while still taking advantage of the benefits of the inventions. Many of the thresholds may be adjustable upward or downward, for example as much as 5% or 10%, or more, to lessen or emphasize processing factors, image information, and the like, as desired. For example, higher thresholds in some instances, such as the edge threshold, may mean that certain image features are not detected as easily, such as a text or character edge, unless the image is higher quality. Those skilled in the art appreciate how changes in the thresholds will affect image analysis. Additionally, it should be understood that including a threshold value in one region or another (e.g. whether the relationship uses greater than or greater than or equal to, or less than or less than or equal to) has relatively little effect overall.

Figure 11:
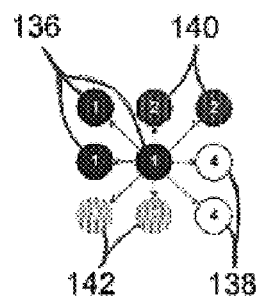
FIG. 11 is a schematic representation of pixels depicting 8-pixel connectivity.
Figure 12:
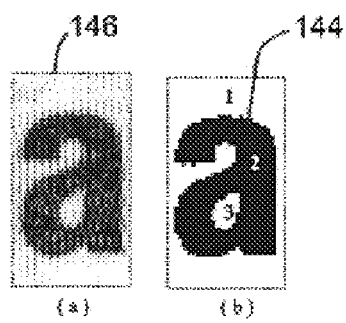
FIG. 12 is a graphical representation of an example of eight-neighbors connectivity for a gray scale image showing the original image and the connected components.

In the connected component analysis (Hierarchical Connected Component (HCC) Analysis), adjacent picture elements that can be considered sufficiently similar are given the same label or identification. In one preferred embodiment, adjacent pixels that are white, for example, are all given the same label or are all characterized the same. The 8-neighbors system is used, depicted in FIG. 11, where colors and numbers are used to represent each pixel's class and identification. Three black pixels 136 are adjacent each other, two white pixels 138 are adjacent each other, two red pixels 140 are adjacent and two gray pixels 142 are adjacent each other. For binarized images, a two label connected component analysis works well in forming higher level visual objects from pixels, as exemplified by FIG. 12, where a connected component labeled "2" corresponds to the character "a" 144, and the labels "1" and "3" correspond to background or white, based on the original image 146.

Figure 13:
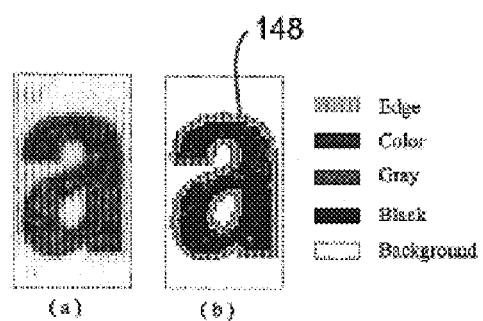
FIG. 13 is a graphical representation of an example of connected components for a color image, including the original image and the connected components.

However, for classification schemes with more than two classes, a connectivity analysis using only two labels may result in fragmentation. Fragmentation of an image portion may be seen in FIG. 13. In FIG. 13, a single character 148 consists of as many as thirty-two connected components. This is not as helpful as desired for segmentation and enhancement. Recognizing the whole character can be achieved by having labels for image elements at two or more levels, which may be considered hierarchical connected components.

Figure 14:
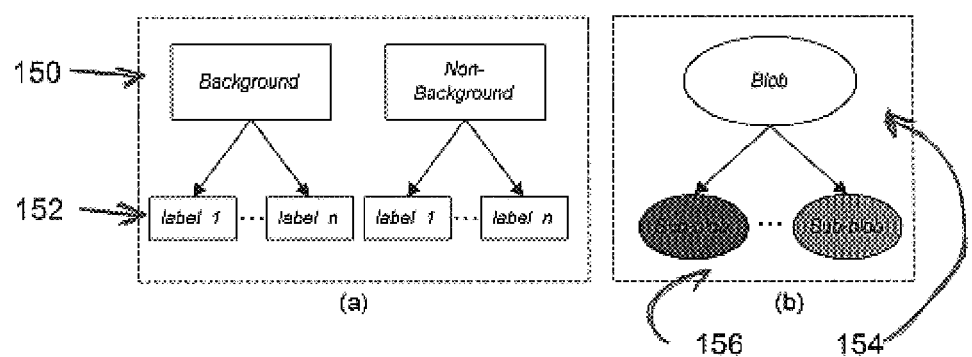
FIG. 14 is a schematic representation of two-level hierarchies for a class and for a region.
Figure 15:
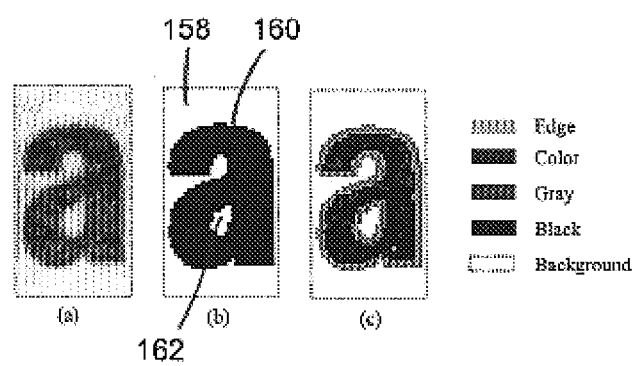
FIG. 15 is a graphical representation of an example of hierarchical connected components for a color image, including the original image, top-level connected components and sub-level connected components.

The concept of hierarchical connected components is preferably based in part on a class or label that can be applied to a portion of the image that is conventionally considered the background, but which may also be considered a baseline, or platform on which the rest of the image or the other image portions are built or placed. The background serves as a spatial delimiter separating visual objects, for example graphic from the rest of the image, graphic from text, characters such as letters from background, and the like. Use or recognition of a background, and assignment of a background label, can then give a hierarchy of connected components having at least two levels. At a first level, pixels are preferably classified into one of two classes, such as background or non-background. Connected components at this level are also called regions or blobs, hereafter Regions. Two neighboring pixels belong to the same Region if they belong to the same category of background or non-background. At the second level, both background and non-background pixels are further divided into multiple subclasses, for example, black, gray, gray edge, color, color edge, etc, depending on the classification scheme. A connected component at this level is called a sub-Region. In other words, two pixels belonging to the same sub-Region preferably have the exact same label, such as color, gray edge or the like. FIG. 14 illustrates the two-level class (150 and 152) and Region hierarchies (154 and 156). FIG. 15 shows an example of the results of a two-level hierarchical connected component analysis. There are three connected components 158, 160 and 162, at the top-level with the character as a single component, and thirty-two connected components at the sub-level.

The hierarchical connected component analysis enables grouping of pixels with certain properties in both value (for example, luminance and/or chrominance) and spatial domains as higher level objects of Regions that somewhat correspond to what an observer perceives in an image.

The hierarchical scheme is not only preferred for meaningful grouping of pixels but also provides a means of Region classification. This classification scheme is based on two observations:

(A) a text character is mainly a homogeneous cluster of pixels. This means that an HCC analysis of a text character would generally consist of a single dominant sub-Region and another sub-Region of edges. While there are possibly many other sub-Regions, their sizes are generally small in a text character.

(B) Pictorial objects are usually not homogeneous. Therefore, in a typical HCC analysis of a pictorial object, the image usually consists of multiple not-so-small sub-Regions of different types.

These observations along with the HCC framework provide one possible basis for classifying pictorial objects:

(A) If there are multiple distinct non-edge sub-Regions within a Region with sizes larger than a given threshold (pixel count) $T_{big}$ (such as 15 for 150 dpi and about 60 for 300 dpi, for example; thresholds for other resolutions can be selected empirically or appropriately scaled from these values for 150 and 300 dpi), the Region can be classified as pictorial. This exemplifies the advantage of the two-level hierarchical analysis scheme. While it was possible to have only top-level connectivity analysis based on background or non-background and a pixel counter for every sub-class, the spatial information of those sub-class pixels could be lost.

(B) All other non-background Regions preferably have only one dominant sub-Region and can be classified by this dominant sub-Region. For example, a black sub-Region preferably dominates a Region classified as black text.

Figure 16:
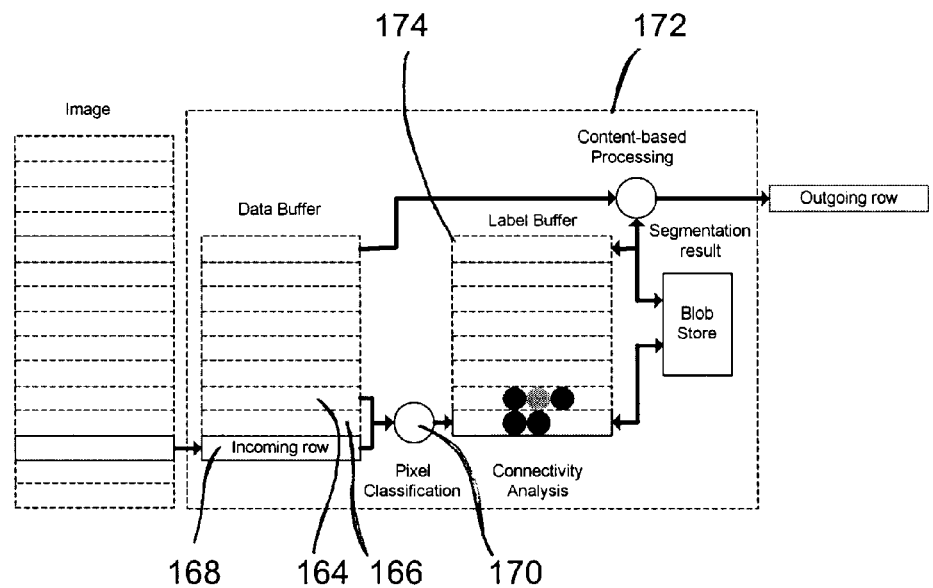
FIG. 16 is a schematic representation of an architecture for raster-scan processing.

For many practical applications, an image is accessed in a sequential manner, from left to right, and from top to bottom, such as a raster scan mode. The whole image may not be available simultaneously, for example due to memory constraints. As an alternative to a full image or to a slice or segment analysis where a significant number of lines are available, a scan-line based processing can be used. A scan-line based process is advantageous in minimizing a scan-to-print or a scan-to-display delay. FIG. 16 shows an implementation using a scan line approach. In this approach, some rows 164, 166 and 168 (preferably three, which is the mask size of the Sobel operator) of image data can be held in a modular (rotational) buffer 170, for example, in a conventional processor 172 such as that used for processing the scanned image. In addition, a label buffer 174 (preferably having at least two rows) is included for holding results of pixel classification and connectivity analysis. Such an implementation with an N-row data buffer can be considered as a pipeline with a delay of N rows. After an initial fill-up delay of N rows, it works in a one-row in and one-row out fashion. The actual number of rows to be used in the buffer will be selected based in part on the trade-off between cost and performance.

Pixel classification in the scan-line approach preferably uses the histogram-based thresholding, which can be easily modified to fit this processing mode. Two possible ways to build or update the histogram include using only pixels inside the buffer (window) to calculate the histogram, giving a histogram of the windowed image. Another way is accumulative, adding pixel counts to the histogram when a new row comes in. At the end of the image, the histogram becomes a global histogram. In either method, the histogram and consequently the thresholds are updated for each new row. The number of rows is preferably not so small as to make the histogram statistically insignificant. As the histogram is being created or after the global histogram is complete, the pixels can be classified using the same process as described previously.

Figure 17:
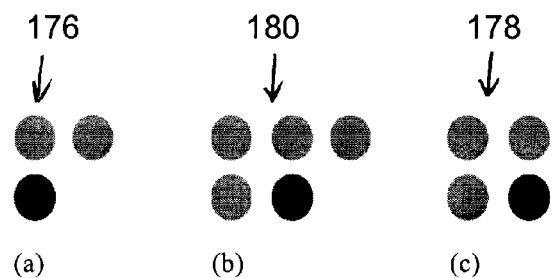
FIG. 17 is a schematic representation of labeled and un-labeled pixels.
Figures 18, 20:
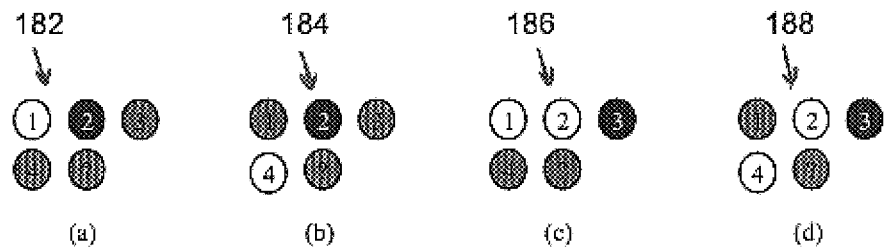
FIG. 18 is a schematic representation of different possible pixel classifications that may lead to erroneous region boundaries.
FIG. 20 is a representation of pseudo-code for a joint operation.

The connectivity analysis in this raster scan order can be carried out using sequential labeling [described more fully in Berthold K. P. Horn, Robot Vision, The MIT Press, Cambridge, Mass., 1986]. In one form, every new pixel coming in has only two, three or four neighboring pixels, 176, 178, and 180, respectively, available depending on its location in the row, as illustrated in FIG. 17. The unknown and therefore unlabeled pixel with only two known neighboring pixels is a left boundary, the unknown pixel with only three known and labeled pixels is a right boundary and the rest are interior pixels. Because of the unknown pixels, Region classification may produce artifacts based on seeing only a partial Region, and a connected Region may be treated as disconnected Regions before encountering the joining pixels, as illustrated in FIG. 18. FIG. 18 shows the incoming unknown pixels with a "?", and situations 182 and 184 where the incoming unknown pixel is part of a Sub-Region. It also shows situations 186 and 188 where the incoming unknown pixel is part of a Region. The unshaded pixels are background pixels.

The first source of artifacts from a Region misclassification occurs when the Region size is larger than the buffer and an undesired decision is due to incompleteness of data. There are possibly two ways to deal with it. The first is to have a special label of "big Region" for all Regions larger than the size of the buffer and choose appropriate action in those applications, for example hold labels. The second is to classify a pixel based on available information and to design a gradual transition scheme in case of changing classification later. Preferably, the number of buffer rows is equal to or larger than the largest font size the algorithm is expected to analyze in order to improve the character-wise consistency of enhancement.

However, even for a Region within the size of buffer, the second source of artifacts may still arise. The cases that will justify a joint operation are illustrated in FIG. 18, where the gray scale shown in the Figure and the number represent a pixel's class label and sub-Region ID, respectively.

Preferably, the system keeps track of pixels belonging to a Region and sub-Region in order to perform a joint operation. Since there may be a large number of pixels belonging to a Region and this type of operation may be done many times during a Region's lifetime, it is preferred to avoid reassignment to every pixel of the Regions involved. Towards this objective, a two-level linked list 190 can be used, as shown in FIG. 13. Every pixel will be assigned a pointer tag pSB, which will be an address to a SubRegion data structure. For a new incoming pixel with label x, comparisons with its neighbors (as illustrated in FIG. 17) will be performed. If one of its neighbors possesses the same label x, the address tag of the neighbor will be copied to the pixel. Otherwise, a new data item of SubRegion will be created and its address assigned to the pixel. In both cases, the SubRegion associated with the incoming pixel will be updated, which will in turn update its top-level Region. Furthermore, the pixel clique will be examined to see if a joint operation is desirable. The joint operation with the data structure consists of traversal of links and pointer operations without the need of reassignment of all the pixels involved. Possible pseudo-code 192 for the joint operation is sketched in FIG. 20.

Figure 21:
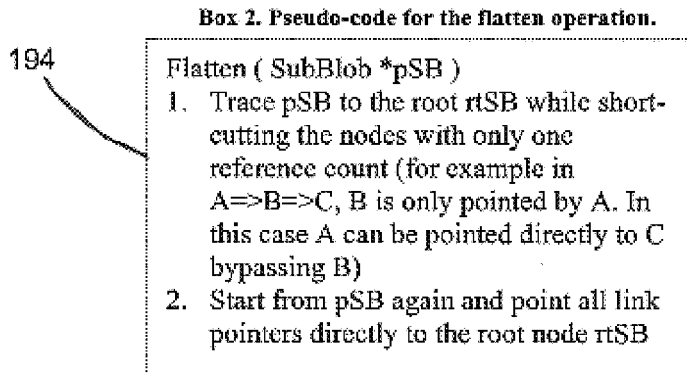
FIG. 21 is a representation of pseudo-code for a flattening operation.
Figure 19:
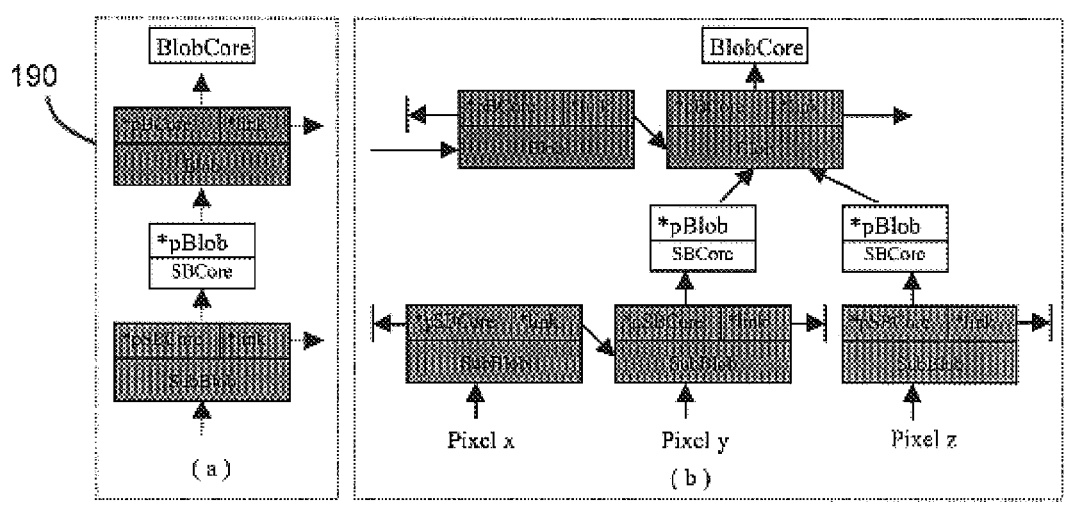
FIG. 19 is a schematic representation of a two-level linked list and an example process.
Figure 22:
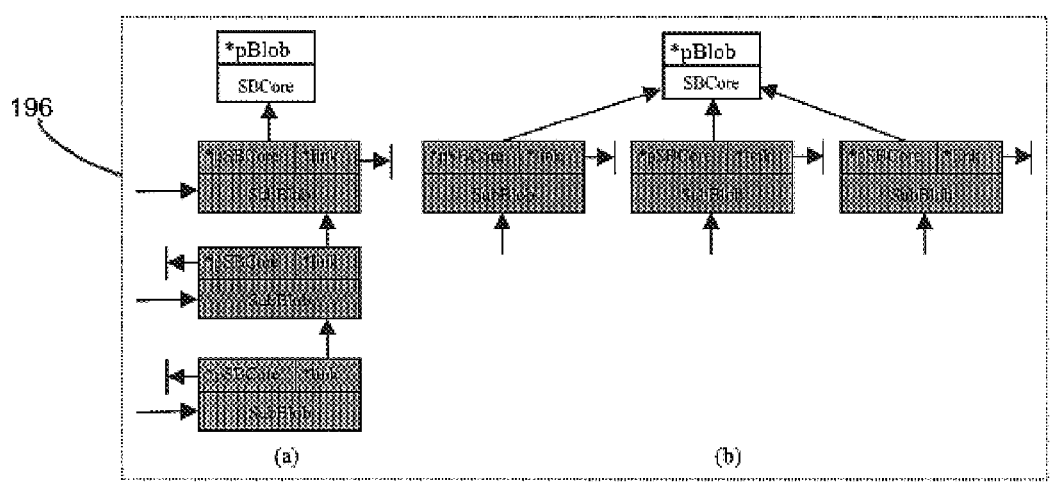
FIG. 22 is a representation of a flattening operation on a link before and after the operation.

As the number of joint operations on a sub-Region/Region increases, so does the length of the links. Longer links may slow down any future joint and retrieval operations involving the sub-Region/Region. Since a sub-Region/Region usually includes a large number of pixels, tracing a long link is preferably minimized or avoided. Therefore, a "flatten" operation is embedded in joint and retrieval to introduce a short cut from nodes directly to the root and therefore shorten the link for future operations. The pseudo-code 194 for the flattening operations on a sub-Region is sketched in FIG. 21. FIG. 22 illustrates the flattening operation 196 by a simple example. An identical approach is preferably applied to Regions.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A method for analyzing a scanned image, the method comprising the steps of:
   receiving a scanned image;
   analyzing at least part of the scanned image pixel-by-pixel;
   assigning a characteristic to a plurality of pixels in the image;
   grouping pixels by similar characteristics; and
   communicating to the scanner a representation of the scanned image, wherein the representation of the scanned image includes at least one of the characteristics corresponding to a group of pixels.

2. The method of claim 1 further comprising the step of receiving in a processor a segment of the image.

3. The method of claim 2 where the step of receiving a segment of the image includes the step of receiving a plurality of lines.

4. The method of claim 3 wherein the step of analyzing at least part of the image includes the step of analyzing pixels in a line.

5. The method of claim 1 wherein the step of analyzing includes the step of determining if the pixel is black or white.

6. The method of claim 1 further comprising the step of determining a threshold value for characterizing pixels as white.

7. The method of claim 1 further comprising the step of comparing adjacent pixels.

8. The method of claim 7 further comprising the step of determining the rate of change of a value of a pixel relative to adjacent pixels.

9. The method of claim 7 further comprising the step of determining the gradient value for a given pixel.

10. The method of claim 1 further comprising the step of determining a gradient value for a given pixel.

11. The method of claim 1 wherein the step of assigning a characteristic to a plurality of pixels includes the step of selecting a characteristic from at least five characteristics and assigning the characteristic to a pixel.

12. The method of claim 1 wherein the step of grouping pixels includes the step of grouping pixels that are adjacent to each other.

13. The method of claim 12 wherein the step of grouping pixels further includes the step of grouping pixels that have been assigned identical characteristics.

14. The method of claim 13 wherein the step of grouping pixels includes the step of grouping pixels that have been assigned identical characteristics and that are adjacent to each other to the same group.

15. The method of claim 1 wherein the step of grouping pixels includes the step of grouping pixels according to whether they are black or white or whether they are graphic.

16. The method of claim 1 wherein the step of grouping pixels according to whether they are black or white includes the step of assigning a text characterization to pixels that are grouped as black or white.

17. The method of claim 1 wherein the step of communicating includes the step of communicating to the scanner a representation indicating that the images are black and white text.

18. The method of claim 1 wherein the step of assigning a characteristic to a plurality of pixels includes the step of classifying the pixels as one of at least white, white edge, gray, gray edge and black.

19. The method of claim 1 wherein the step of grouping pixels includes the step of distinguishing pixels between at least two levels of pixel component.

20. The method of claim 19 wherein the step of distinguishing pixels includes the step of distinguishing between background pixels and non-background pixels.

21. The method of claim 1 further comprising the step of analyzing a group of pixels to determine if there is more than one dominant sub class of pixels.

22. The method of claim 21 wherein the step of analyzing includes the step of assigning a text label to a group of pixels if there is no more than one dominant sub class of pixels.

23. The method of claim 21 wherein the step of analyzing includes the step of assigning a graphic label to a group of pixels if there is more than one dominant sub class of pixels.

24. A method of evaluating an image comprising the steps of:

receiving a scanned image;

segmenting at least part of the scanned image to produce a segmented image;

analyzing the segmented image for text or graphic;

classifying the at least part of the image as text only, graphic only or mixed; and, communicating to a scanner a characteristic of the scanned image.

25. The method of claim 24 wherein the step of analyzing includes the step of determining pixel-by-pixel whether the pixel is black, white or graphic.

26. The method of claim 24 wherein the step of classifying includes the step of grouping pixels by similar pixel type.

27. The method of claim 26 wherein the step of classifying further includes the step of grouping pixels by proximity to adjacent pixels of the same type.

28. The method of claim 24 further comprising the step of storing the classification of the at least part of the image.

29. The method of claim 28 further comprising the step of retrieving the stored classification of the at least part of the image.

30. The method of claim 29 wherein the step of retrieving the stored classification further comprises the step of retrieving classification information for the complete image.

31. The method of claim 29 wherein the step of retrieving the stored classification further comprises the step of retrieving classification information for the at least part of the image and further comprising the step of scanning a part of the image corresponding to the at least part of the image classified.

32. The method of claim 24 wherein the step of classifying comprises the step of classifying the entire image from classification of pixels in the image.

33. A method for controlling a scanner, comprising receiving a scanned image;

segmenting at least part of the scanned image to produce a segmented image;

processing the segmented image using a CPU, wherein processing includes classifying the at least part of the segmented image as text only, graphic only, or mixed; and communicating to a scanner of at least one of the classification characteristics such that the CPU applies settings to the scanner based on the classification.

* * * * *

UNITED STATES PATENT AND TRADEMARK OFFICE
CERTIFICATE OF CORRECTION

PATENT NO. : 6,757,081 B1
DATED : June 29, 2004
INVENTOR(S) : Fan et al.

It is certified that error appears in the above-identified patent and that said Letters Patent is hereby corrected as shown below:

Title page,
Item [54], Title, should read -- METHODS AND APPARATUS FOR ANALYZING AN IMAGE AND FOR CONTROLLING A SCANNER --;

Column 20,
Line 28, after "scanner", delete "of".

Signed and Sealed this

Second Day of August, 2005

JON W. DUDAS
*Director of the United States Patent and Trademark Office*